(12) United States Patent
Ohmori et al.

(10) Patent No.: US 8,603,696 B2
(45) Date of Patent: Dec. 10, 2013

(54) REACTOR

(75) Inventors: Makoto Ohmori, Nagoya (JP); Natsumi Shimogawa, Nagoya (JP); Tsutomu Nanataki, Toyoake (JP); Masayuki Shinkai, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 1291 days.

(21) Appl. No.: 12/174,668

(22) Filed: Jul. 17, 2008

(65) Prior Publication Data

US 2009/0023048 A1    Jan. 22, 2009

(30) Foreign Application Priority Data

Jul. 19, 2007 (JP) ................................. 2007-188539
May 28, 2008 (JP) ................................. 2008-139519

(51) Int. Cl.
*H01M 8/02* (2006.01)

(52) U.S. Cl.
USPC ........... 429/460; 429/452; 429/467; 429/469; 429/508; 429/509

(58) Field of Classification Search
USPC ........... 429/35, 402–405, 407, 434, 452, 460, 429/463–465, 467–471, 507–511
See application file for complete search history.

(56) References Cited

U.S. PATENT DOCUMENTS

| | | | |
|---|---|---|---|
| 5,942,348 A * | 8/1999 | Jansing et al. | 429/496 |
| 6,096,451 A | 8/2000 | Shiratori et al. | |
| 6,656,625 B1 * | 12/2003 | Thompson et al. | 429/465 |
| 7,323,268 B2 | 1/2008 | Robert | |
| 2003/0232230 A1 | 12/2003 | Carter et al. | |
| 2006/0166076 A1 * | 7/2006 | Kuroki et al. | 429/44 |
| 2007/0212587 A1 * | 9/2007 | Fragiadakis et al. | 429/35 |
| 2009/0152125 A1 * | 6/2009 | Jacobson et al. | 205/619 |

FOREIGN PATENT DOCUMENTS

| | | |
|---|---|---|
| JP | 6-76840 | 3/1994 |
| JP | 2004-342584 A1 | 12/2004 |
| WO | 03-036739 A2 | 5/2003 |

* cited by examiner

*Primary Examiner* — James Mitchell
*Assistant Examiner* — Colleen E Snow
(74) *Attorney, Agent, or Firm* — Burr & Brown

(57) ABSTRACT

In a fuel cell, perimetric portions of each sheet body, an upper support member, and a lower support member are sealed against one another by a seal that includes first and second seal portions. The first seal portion is of glass having a softening point lower than a working temperature of the reactor and seals against the upper surface of the perimetric portion of the sheet body and the lower surface of the perimetric portion of the upper support member as well as against the lower surface of the perimetric portion of the sheet body and the upper surface of the perimetric portion of the lower support member. The second seal portion is of glass having a softening point higher than the working temperature and seals against the lower side end and upper side end of the perimetric portions of the upper and lower support members, respectively.

8 Claims, 10 Drawing Sheets

REACTOR

BACKGROUND OF THE INVENTION

1. Field of the Invention

The present invention relates to a reactor, such as a solid oxide fuel cell (SOFC), and particularly to a reactor having a (flat-plate) stack structure in which sheet bodies and support members for supporting the sheet bodies are stacked in alternating layers.

2. Description of the Related Art

Conventionally, a solid oxide fuel cell having the above-mentioned stack structure has been known (refer to, for example, Japanese Patent Application Laid-Open (kokai) No. 2004-342584). In this case, the sheet body (may also be referred to as the "single cell") can be a fired body in which a solid electrolyte layer formed from zirconia, a fuel electrode layer, and an air electrode layer are arranged in layers such that the fuel electrode layer is formed on the upper surface of the solid electrolyte layer and such that the air electrode layer is formed on the lower surface of the solid electrolyte layer. Hereinafter, the support member (may also be referred to as the "interconnector") adjacent to the upper side of each of the sheet bodies may also be referred to as the "upper support member," and the support member adjacent to the lower side of each of the sheet bodies may also be referred to as the "lower support member."

A perimetric portion of each of the sheet bodies is held between the lower surface of a perimetric portion of the upper support member and the upper surface of a perimetric portion of the lower support member. By employment of this configuration, a fuel flow channel to which a fuel gas is supplied is formed in a space between the lower surface of a plane portion of the upper support member, the plane portion being located inward of the perimetric portion of the upper support member, and the upper surface of the fuel electrode layer of the sheet body. Similarly, an air flow channel to which a gas (air) that contains oxygen is supplied is formed in a space between the upper surface of a plane portion of the lower support member, the plane portion being located inward of the perimetric portion of the lower support member, and the lower surface of the air electrode layer of the sheet body.

According to the above configuration, in a state in which the sheet bodies are heated to a working temperature of the solid oxide fuel cell (e.g., 800° C.; hereinafter, merely referred to as the "working temperature"), a fuel gas and air are supplied to the fuel flow channels and to the air flow channels, respectively, whereby the fuel gas and air come into contact with the upper surfaces and the lower surfaces, respectively, of the sheet bodies. As a result, electricity-generating reactions occur in the sheet bodies.

SUMMARY OF THE INVENTION

In the solid oxide fuel cell having the above-mentioned stack structure, in order to prevent the mixing of the fuel gas flowing through the fuel flow channels and air flowing through the air flow channels and to prevent outward leakage of the fuel gas and air as well as to maintain the shape of the entire fuel cell, generally, the perimetric portion of each of the sheet bodies, the perimetric portion of the adjacent upper support member, and the perimetric portion of the adjacent lower support member are sealed against one anther and fixed together by means of a seal.

The support members are generally formed from metal and thus have, in many cases, a thermal expansion coefficient higher than that of the sheet bodies. For example, in the case where the support members are higher in thermal expansion coefficient than the sheet bodies, when the sheet bodies are heated from room temperature to a working temperature, the support members attempt to expand in the planar direction more than do the sheet bodies. However, as mentioned above, the seal fixes the perimetric portion of each of the sheet bodies to the perimetric portions of the upper and lower support members. As a result, the upper and lower support members impose a tensile force (thermal stress) along the planar direction on the perimetric portion of each of the sheet bodies. Also, in the case where a temperature difference arises locally in the interior of the fuel cell at the time of, for example, quick start of the fuel cell, the sheet bodies are subjected to thermal stress induced by the temperature difference.

If the seal provides fixation such that relative movement is completely disabled, the above-mentioned tensile force (thermal stress) to which the sheet bodies are subjected will become excessive, potentially causing the occurrence of cracks in the sheet bodies or a like problem. As the thickness of each of the sheet bodies reduces, such a problem becomes more likely to arise.

In view of the foregoing, an object of the present invention is to provide a small-sized reactor having a stack structure in which sheet bodies and support members are stacked in alternating layers, and configured to be able to restrain the occurrence of cracks in the sheet bodies, which could otherwise result from thermal stress to which the sheet bodies are subjected when the sheet bodies are heated from room temperature to a high working temperature.

To achieve the above object, a reactor according to the present invention comprises a single or a plurality of sheet bodies in which a chemical reaction is carried out at a working temperature higher than room temperature, and a plurality of support members for supporting the single or the plurality of sheet bodies, the single or the plurality of sheet bodies and the plurality of support members being stacked in alternating layers. The thermal expansion coefficient of the support member may be higher or lower than that of the sheet body. In view of a reduction in the overall size of the reactor, preferably, each of the sheet bodies has a thickness of 20 μm to 500 μm inclusive and exhibits a uniform thickness over the entirety thereof.

A perimetric portion of each of the sheet bodies is held between a lower surface of a perimetric portion of the adjacent upper support member and an upper surface of a perimetric portion of the adjacent lower support member; and the perimetric portion of the sheet body, the perimetric portion of the upper support member, and the perimetric portion of the lower support member are sealed against one another by means of a seal.

The reactor of the present invention is characterized in that the seal differs in material depending on location in a region which the seal occupies. Specifically, the seal includes a first seal portion for sealing against an upper surface of the perimetric portion of the sheet body and the lower surface of the perimetric portion of the upper support member and for sealing against a lower surface of the perimetric portion of the sheet body and the upper surface of the perimetric portion of the lower support member, and a second seal portion for sealing against a lower side end of the perimetric portion of the upper support member and an upper side end of the perimetric portion of the lower support member. Further, at least a portion of the first seal portion which is in contact with the upper and lower surfaces of the perimetric portion of the sheet body is of glass having a first softening point lower than the working temperature, whereas at least a portion of the second seal portion which is located between the lower side end of the perimetric portion of the upper support member and the upper side end of the perimetric portion of the lower support member is of glass having a second softening point higher than the first softening point, or of ceramic.

More specifically, for example, the seal may be configured as follows. The first seal portion and the second seal portion are separated from each other; the entire first seal portion is of glass having the first softening point; and the entire second seal portion is of glass having the second softening point, or of ceramic. The second seal portion has an ingress portion, which ingresses into a space between the lower surface of the perimetric portion of the upper support member and the upper surface of the perimetric portion of the lower support member, and a cover portion, which is integral with the ingress portion and covers a side surface of the perimetric portion of the upper support member and a side surface of the perimetric portion of the lower support member. Alternatively, the entire first seal portion is of glass having the first softening point, and the entire second seal portion is of glass having the second softening point, or of ceramic; the second seal portion has an ingress portion, which ingresses into a space between the lower surface of the perimetric portion of the upper support member and the upper surface of the perimetric portion of the lower support member, and a cover portion, which is integral with the ingress portion and covers a side surface of the perimetric portion of the upper support member and a side surface of the perimetric portion of the lower support member; and the first seal portion is in contact with the ingress portion of the second seal portion.

Through employment of the above configuration, the first seal portion of glass having the first softening point exhibits a function of sealing against the upper surface of the perimetric portion of the sheet body and the lower surface of the perimetric portion of the upper support member (a function of sealing a space or an interface therebetween) as well as a function of sealing against the lower surface of the perimetric portion of the sheet body and the upper surface of the perimetric portion of the lower support member (a function of sealing a space or an interface therebetween). When the temperature of the first seat portion is lower than the first softening point, the first seal portion can fix together the perimetric portion of the sheet body and the perimetric portions of the upper and lower support members such that relative movement is completely disabled. When the temperature of the first seal portion is equal to or higher than the first softening point, the first seal portion is softened, thereby allowing the movement of the perimetric portion of the sheet body in relation to the perimetric portions of the upper and lower support members. Additionally, the first softening point is lower than the working temperature of the sheet body.

Accordingly, in the course of the temperature of the sheet bodies (thus, the temperature of the first seat portion) rising from room temperature to the working temperature, the perimetric portion of each of the sheet bodies becomes movable in relation to the perimetric portions of the upper and lower support members. By virtue of this, when the temperature of the sheet bodies reaches the working temperature, the abovementioned tensile force (thermal stress) which the upper and lower support members impose on each of the sheet bodies can be restrained from becoming excessive, thereby restraining the occurrence of cracks in the sheet bodies or a like problem.

Meanwhile, the second seal portion of glass having the second softening point or ceramic exhibits a function of sealing against the lower side end of the perimetric portion of the upper support member and the upper side end of the perimetric portion of the lower support member (sealing a space or clearance therebetween). The second softening point is higher than the first softening point. For example, the second softening point is higher than the working temperature. In this case, even when the temperature of the sheet bodies rises to the working temperature, the second seal portion can fix together the perimetric portions of the upper and lower support members such that relative movement is completely disabled.

In the case where glass used to form the second seal portion has a crystallization temperature (>second softening point), even when the second softening point is lower than the working temperature, after the temperature of the second seal portion is raised to at least a temperature higher than the crystallization temperature in a heat treatment process in the course of manufacture of the reactor or during operation of the reactor, the second seal portion is partially or entirely crystallized. As a result, the second seal portion can fix together the perimetric portions of the upper and lower support members such that relative movement is completely disabled. Thus, the shape of the entire reactor can be maintained.

As mentioned above, the seal according to the present invention has the following features. The first seal portion has a function of allowing movement of the perimetric portions of the sheet bodies in relation to the perimetric portions of the upper and lower support members, in addition to a sealing function. The second seal portion has a function of maintaining the shape of the entire reactor, in addition to a sealing function. In this manner, the seal differs in material depending on location in a region which the seal occupies, whereby a sealing function and a function of maintaining the shape of the entire reactor can be stably exhibited, and the occurrence of cracks in the sheet bodies can be restrained at the time of the temperature of the sheet bodies being raised to the working temperature.

Additionally, the (flat-plate) stack structure of the reactor according to the present invention has the following potential disadvantage. At the time of, for example, quick start of the reactor (e.g., solid oxide fuel cell), a greatly uneven temperature distribution could arise transiently along the stacking direction (the thickness direction of the sheet bodies). Even in this case, the sheet bodies sequentially release the abovementioned thermal stress through softening of the first seat portion from the sheet bodies whose temperature reaches the first softening point. In other words, the stack structure is such that the sheet bodies can individually release thermal stress. Accordingly, the stack structure is free from accumulation of thermal stress along the stacking direction, thereby providing good durability against thermal stress.

Preferably, the reactor according to the present invention is, for example, a solid oxide fuel cell. In this case, each of the sheet bodies is a fired laminate of a solid electrolyte layer, a fuel electrode layer formed on an upper surface of the solid electrolyte layer, and an air electrode layer formed on a lower surface of the solid electrolyte layer; and a fuel flow channel to which a fuel gas is supplied is formed in a space between an upper surface of the fuel electrode layer of each of the sheet bodies and a lower surface of a plane portion of the upper support member, the plane portion being located inward of the perimetric portion of the upper support member, and an air flow channel to which a gas that contains oxygen is supplied is formed in a space between a lower surface of the air electrode layer of the sheet body and an upper surface of a plane portion of the lower support member, the plane portion being located inward of the perimetric portion of the lower support member.

In the case of a solid oxide fuel cell, generally, the working temperature is 600° C. to 900° C. inclusive. In this case, preferably, the first softening point is 400° C. to 700° C. inclusive, and the second softening point is 600° C. to 900° C. inclusive. Our studies have revealed that, through employment of the first and second softening point ranges, a function of maintaining the shape of the entire reactor can be stably exhibited, and the occurrence of cracks in the sheet bodies can be restrained at the time of the temperature of the sheet bodies being raised to the working temperature.

In the reactor according to the present invention, preferably, a current-collecting member is confined in each of a space between an upper surface of each of the sheet bodies and the lower surface of the plane portion of the upper support member, the plane portion being located inward of the perimetric portion of the upper support member, and a space between a lower surface of the sheet body and the upper surface of the plane portion of the lower support member, the plane portion being located inward of the perimetric portion of the lower support member, and ensures an electrical connection between the sheet body and each of the upper and lower support members; and the current-collecting members have elasticity along the stacking direction and are confined in such a manner as to generate respective elastic forces that act in such directions as to move the upper and lower support members away from the sheet body along the stacking direction.

The confinement of the current-collecting members can ensure an electrical connection between each of the sheet bodies and the support members adjacent to the sheet body. Further, our studies have revealed that, by virtue of the action of an elastic force which the upper and lower current-collecting members impose on each of the sheet bodies in addition to the above-mentioned softening action of the first seal portion, at the time of, for example, quick start of the reactor (e.g., solid oxide fuel cell), cracking of the sheet bodies becomes less likely to occur.

In this case (particularly, in the case of the above-mentioned solid oxide fuel cell in which each of the sheet bodies has a thickness of 20 µm to 500 µm inclusive), preferably, an elastic modulus associated with the elasticity of each of the current-collecting members is 0.1 N/µm to 8 N/µm inclusive.

Our studies have revealed that, when the elastic modulus of each of the current-collecting members is in excess of 8 N/µm, at the time of, for example, quick start of the reactor (e.g., solid oxide fuel cell), cracking of the sheet bodies is even more likely to occur (as will be described later in detail). Our studies also have revealed that, when the elastic modulus of each of the current-collecting members is less than 0.1 N/µm, defective contact is apt to occur between the current-collecting member and the support member or between the current-collecting member and the sheet body (as will be described later in detail).

Thus, when the elastic modulus of each of the current-collecting members is 0.1 N/µm to 8 N/µm, an electrical connection between each of the sheet bodies and the support member adjacent to the sheet body can be ensured, and, at the time of, for example, quick start of the reactor (e.g., solid oxide fuel cell), cracking of the sheet bodies can be rendered unlikely to occur.

DETAILED DESCRIPTION OF THE INVENTION

A solid oxide fuel cell (reactor) according to an embodiment of the present invention will next be described with reference to the drawings.

Figure 1:
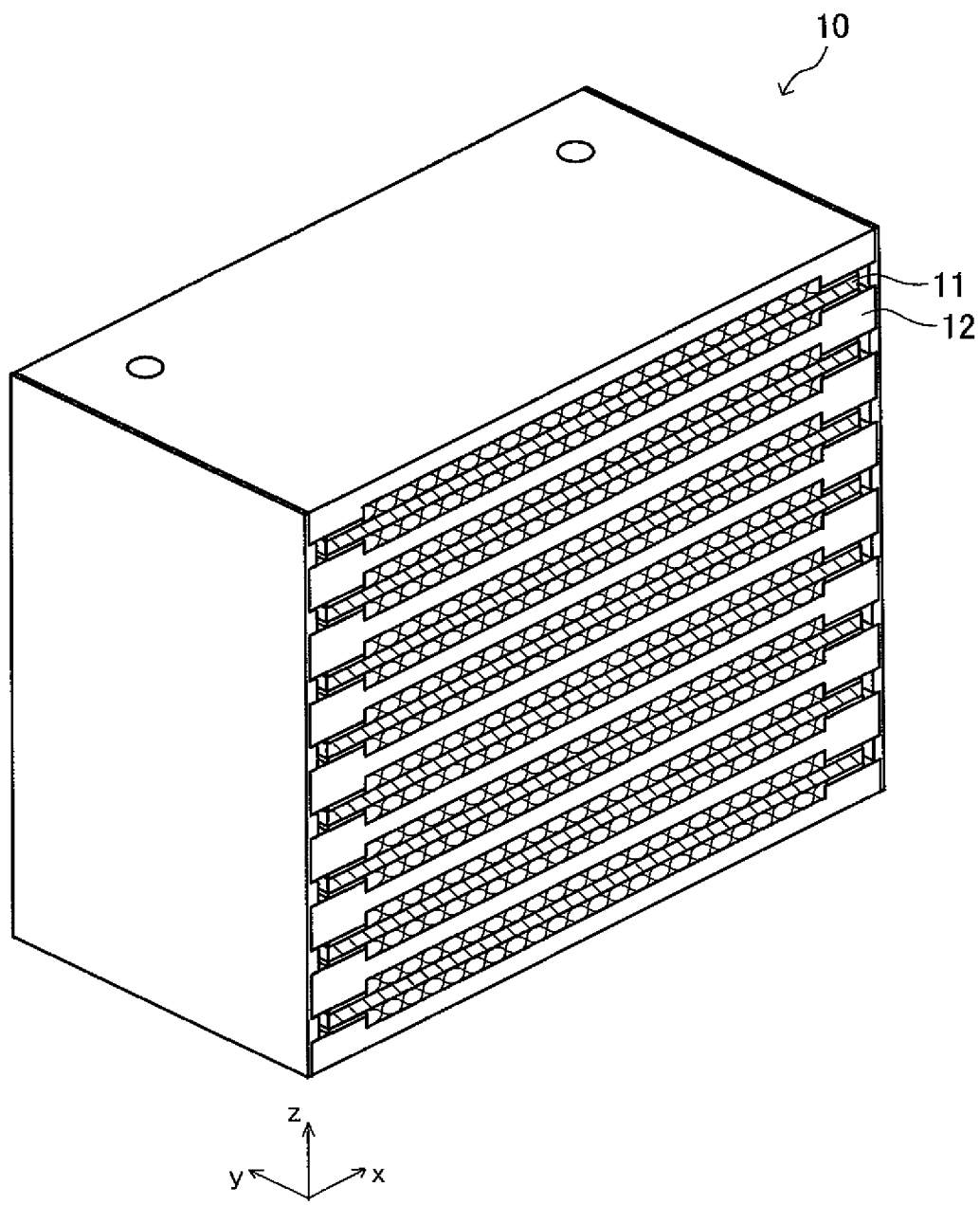
FIG. 1 is a perspective cutaway view of a solid oxide fuel cell according to an embodiment of the present invention.
Figure 2:
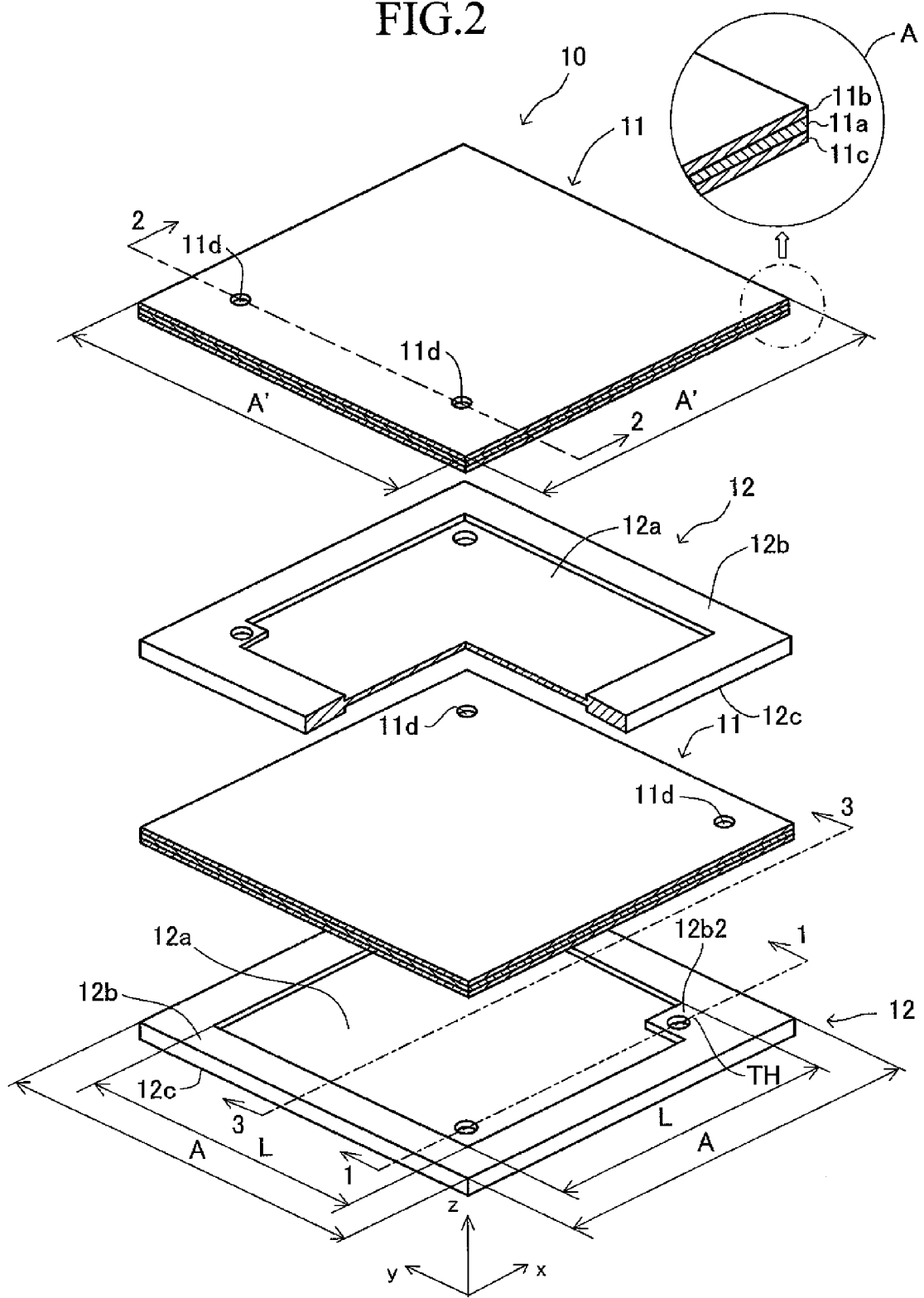
FIG. 2 is an exploded partial, perspective view of the fuel cell shown in FIG. 1.

Overall Structure of Fuel Cell:

FIG. 1 perspectively shows, in a cutaway fashion, a solid oxide fuel cell (hereinafter, referred to merely as the "fuel cell") 10, which is a device according to an embodiment of the present invention. FIG. 2 perspectively and partially shows, in an exploded fashion, the fuel cell 10. The fuel cell 10 is configured such that sheet bodies 11 and support members 12 are stacked in alternating layers. That is, the fuel cell 10 has a flat-plate stack structure. The sheet body 11 is also referred to as a "single cell" of the fuel cell 10. The support member 12 is also referred to as an "interconnector."

As shown on an enlarged scale within a circle A of FIG. 2, the sheet body 11 has an electrolyte layer (solid electrolyte layer) 11a, a fuel electrode layer 11b formed on the electrolyte layer 11a (on the upper surface of the electrolyte layer 11a), and an air electrode layer 11c formed on a side of the electrolyte layer 11a opposite the fuel electrode layer 11b (on the lower surface of the electrolyte layer 11a). The planar shape of the sheet body 11 is a square having sides (length of one side=A') extending along mutually orthogonal x- and y-axes. The sheet body 11 has a thickness along a z-axis orthogonal to the x-axis and the y-axis.

In the present embodiment, the electrolyte layer 11a is a dense fired body of YSZ (yttria-stabilized zirconia). The fuel electrode layer 11b is a fired body of Ni—YSZ and a porous electrode layer. The air electrode layer 11c is a fired body of LSM (La(Sr)MnO3: lanthanum strontium manganite)-YSZ and a porous electrode layer. The electrolyte layer 11a, the fuel electrode layer 11b, and the air electrode layer 11c have room-temperature-to-1,000° C. mean thermal expansion coefficients of about 10.8 ppm/K, 12.5 ppm/K, and 11 (10.8) ppm/K, respectively. The air electrode layer 11c may be a fired body of LSCF (lanthanum strontium cobalt ferrite). In this case, the air electrode layer 11c has a room-temperature-to-1,000° C. mean thermal expansion coefficient of 12 ppm/K.

The sheet body 11 has a pair of cell through-holes 11d. Each of the cell through-holes 11d extends through the electrolyte layer 11a, the fuel electrode layer 11b, and the air electrode layer 11c. The paired cell through-holes 11d are formed in the vicinity of one side of the sheet body 11 and in the vicinity of corresponding opposite ends of the side.

Figure 3:
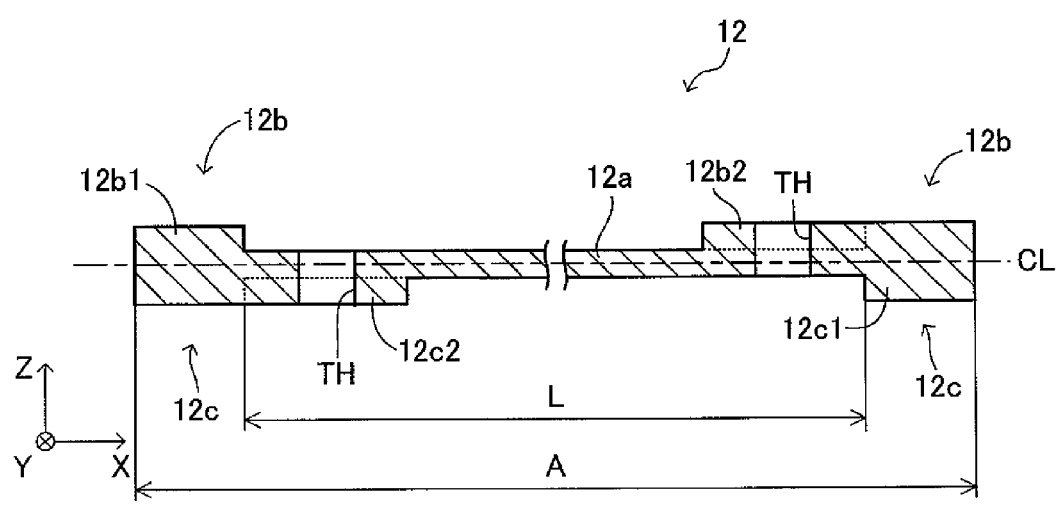
FIG. 3 is a sectional view of a support member taken along a plane which includes line 1-1 of FIG. 2 and is in parallel with an x-z plane.

FIG. 3 is a sectional view of the support member 12 taken along a plane which includes line 1-1 of FIG. 2 parallel with the x-axis and is in parallel with the x-z plane.

As shown in FIGS. 2 and 3, the support member 12 includes a plane portion 12a, an upper frame portion 12b, and a lower frame portion 12c. The planar shape of the support member 12 is a square having sides (length of one side=A; A is slightly greater than A') extending along the mutually orthogonal x- and y-axes.

The support member 12 is formed from an Ni-based heat-resistant alloy (e.g., ferritic SUS, INCONEL 600, or HASTELLOY). The support member 12 formed from, for example, SUS430, which is a ferritic SUS, has a room-temperature-to-1,000° C. mean thermal expansion coefficient of about 12.5 ppm/K. Thus, the thermal expansion coefficient of the support member 12 is higher than the mean thermal expansion coefficient of the sheet body 11. Accordingly, when the temperature of the fuel cell 10 varies, a difference in expansion or contraction arises between the sheet body 11 and the support member 12.

The plane portion 12a is a thin, flat body having a thickness along the z-axis. The planar shape of the plane portion 12a is a square having sides (length of one side=L (<A)) extending along the x-axis and the y-axis.

The upper frame portion 12b is a frame body provided around the plane portion 12a (in a region in the vicinity of the four sides of the plane portion 12a; i.e., an outer peripheral region of the plane portion 12a) in an upwardly facing condition. The upper frame portion 12b consists of a perimetric frame portion 12b1 and a jutting portion 12b2.

The perimetric frame portion 12b1 is located on a side toward the perimeter of the support member 12. The vertical section of the perimetric frame portion 12b1 (e.g., a section of the perimetric frame portion 12b1 whose longitudinal direction coincides with the direction of the y-axis, taken along a plane parallel with the x-z plane) assumes a rectangular shape (or a square shape).

The jutting portion 12b2 juts toward the center of the support member 12 from the inner peripheral surface of the perimetric frame portion 12b1 at one of four corner portions of the plane portion 12a. The lower surface of the jutting portion 12b2 is integral with the plane portion 12a. The shape of the jutting portion 12b2 as viewed in plane is substantially square. The upper surface (plane) of the jutting portion 12b2 is continuous with the upper surface (plane) of the perimetric frame portion 12b1. The jutting portion 12b2 has a through-hole TH formed therein. The through-hole TH also extends through a portion of the plane portion 12a which is located under the jutting portion 12b2.

The lower frame portion 12c is a frame body provided around the plane portion 12a (in a region in the vicinity of the four sides of the plane portion 12a; i.e., an outer peripheral region of the plane portion 12a) in a downwardly facing condition. The lower frame portion 12c is symmetrical with the upper frame portion 12b with respect to a centerline CL which halves the thickness of the plane portion 12a. Accordingly, the lower frame portion 12c has a perimetric frame portion 12c1 and a jutting portion 12c2 which are identical in shape with the perimetric frame portion 12b1 and the jutting portion 12b2, respectively. However, the jutting portion 12c2 is formed at one of two corner portions of the plane portion 12a which neighbor the corner portion of the plane portion 12a where the jutting portion 12b2 is formed.

Figure 4:
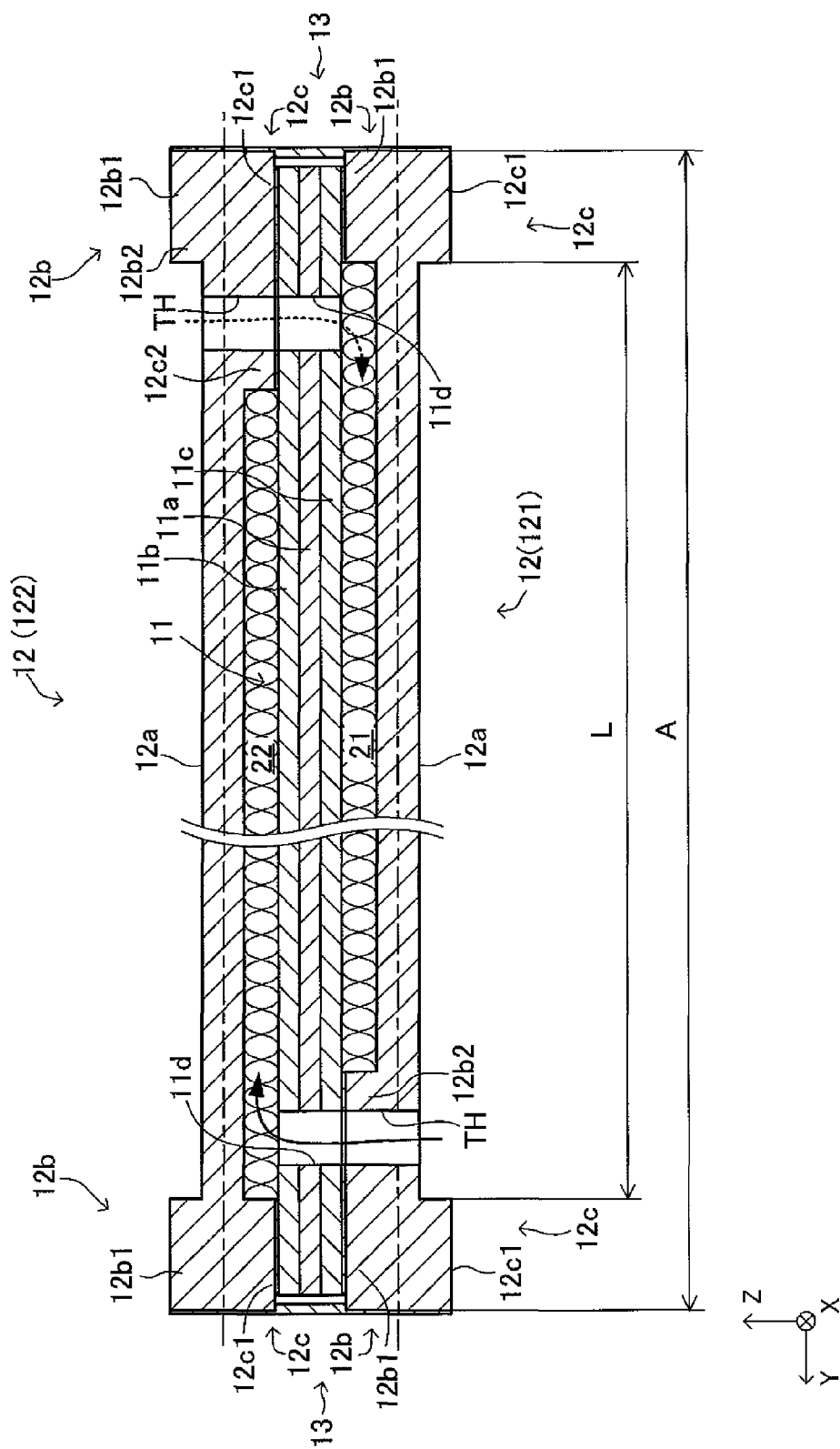
FIG. 4 is a vertical sectional view of a sheet body shown in FIG. 1 and two support members in a state of supporting the sheet body therebetween, the sectional view being taken along a plane which includes line 2-2 of FIG. 2 and is in parallel with a y-z plane.

FIG. 4 is a vertical sectional view of the sheet body 11 and a pair of the support members 12 in a state of supporting (holding) the sheet body 11 therebetween, the sectional view being taken along a plane which includes line 2-2 of FIG. 2 parallel with the y-axis and is in parallel with a y-z plane. As mentioned previously, the fuel cell 10 is formed by stacking the sheet bodies 11 and the support members 12 in alternating layers.

For convenience of description, of the paired support members 12, the support member 12 adjacent to the lower side of the sheet body 11 is referred to as a lower support member 121, and the support member 12 adjacent to the upper side of the sheet body 11 is referred to as an upper support member 122. As shown in FIG. 4, the lower support member 121 and the upper support member 122 are coaxially arranged such that the lower frame portion 12c of the upper support member 122 is located above the upper frame portion 12b of the lower support member 121 in a mutually facing manner.

The overall perimetric portion of the sheet body 11 is sandwiched between the upper surface of the upper frame portion 12b (a perimetric portion) of the lower support member 121 and the lower surface of the lower frame portion 12c (a perimetric portion) of the upper support member 122. At this time, the sheet body 11 is arranged such that the air electrode layer 11c faces the upper surface of the plane portion 12a of the lower support member 121 and such that the fuel electrode layer 11b faces the lower surface of the plane portion 12a of the upper support member 122.

The overall perimetric portion of the sheet body 11, the upper frame portion 12b of the lower support member 121, and the lower frame portion 12c of the upper support member 122 are sealed against one another by means of a seal 13. The seal 13 will be described later.

One side of the planar shape (square shape) of the support member 12 has a length A of, in the present embodiment, 5 mm to 200 mm inclusive. One side of the planar shape (square shape) of the plane portion 12a of the support member 12 has a length L of, in the present embodiment, 4 mm to 190 mm inclusive. The thickness t of the sheet body 11 is distributed uniformly throughout the sheet body 11 and is, in the present embodiment, 20 µm to 500 µm inclusive. The electrolyte layer 11a, the fuel electrode layer 11b, and the air electrode layer 11c have thicknesses of, for example, 1 µm to 50 µm inclusive, 5 µm to 500 µm inclusive, and 5 µm to 200 µm inclusive, respectively.

Thus, as shown in FIG. 4, the upper surface of the plane portion 12a of the lower support member 121, the inner wall surface of the upper frame portion 12b (the perimetric frame portion 12b1 and the jutting portion 12b2) of the lower support member 121, and the lower surface of the air electrode layer 11c of the sheet body 11 define an air flow channel 21 to which a gas that contains oxygen is supplied. As indicated by the broken-line arrow of FIG. 4, the gas that contains oxygen flows into the air flow channel 21 through the through-hole TH of the upper support member 122 and the cell through-hole 11d of the sheet body 11.

Also, the lower surface of the plane portion 12a of the upper support member 122, the inner wall surface of the lower frame portion 12c (the perimetric frame portion 12c1 and the jutting portion 12c2) of the upper support member 122, and the upper surface of the fuel electrode layer 11b of the sheet body 11 define a fuel flow channel 22 to which a fuel that contains hydrogen is supplied. As indicated by the solid-line arrow of FIG. 4, the fuel flows into the fuel flow channel 22 through the through-hole TH of the lower support member 121 and the cell through-hole 11d of the sheet body 11.

As shown in FIG. 4, a current-collecting metal mesh (e.g., an embossed metal mesh) is confined in each of the air flow channel 21 and the fuel flow channel 22. The metal meshes have elasticity along the stacking direction. Further, each of the metal meshes is confined in such a manner as to generate an elastic force (i.e., a preload) that acts in such directions as to move the corresponding support member 12 and sheet body 11 away from each other along the stacking direction.

The above feature ensures an electrical connection between the lower support member 121 and the sheet body 11 and an electrical connection between the upper support member 122 and the sheet body 11. Further, the confinement of such a metal mesh restricts the gas flow in the flow channel. As a result, in the air flow channel 21 and the fuel flow channel 22 as viewed in plane, the area of a region (the area of flow) where electricity-generating reactions can virtually occur by means of a gas flow can be expanded, whereby electricity-generating reactions can effectively occur in the sheet body 11.

Figure 5:
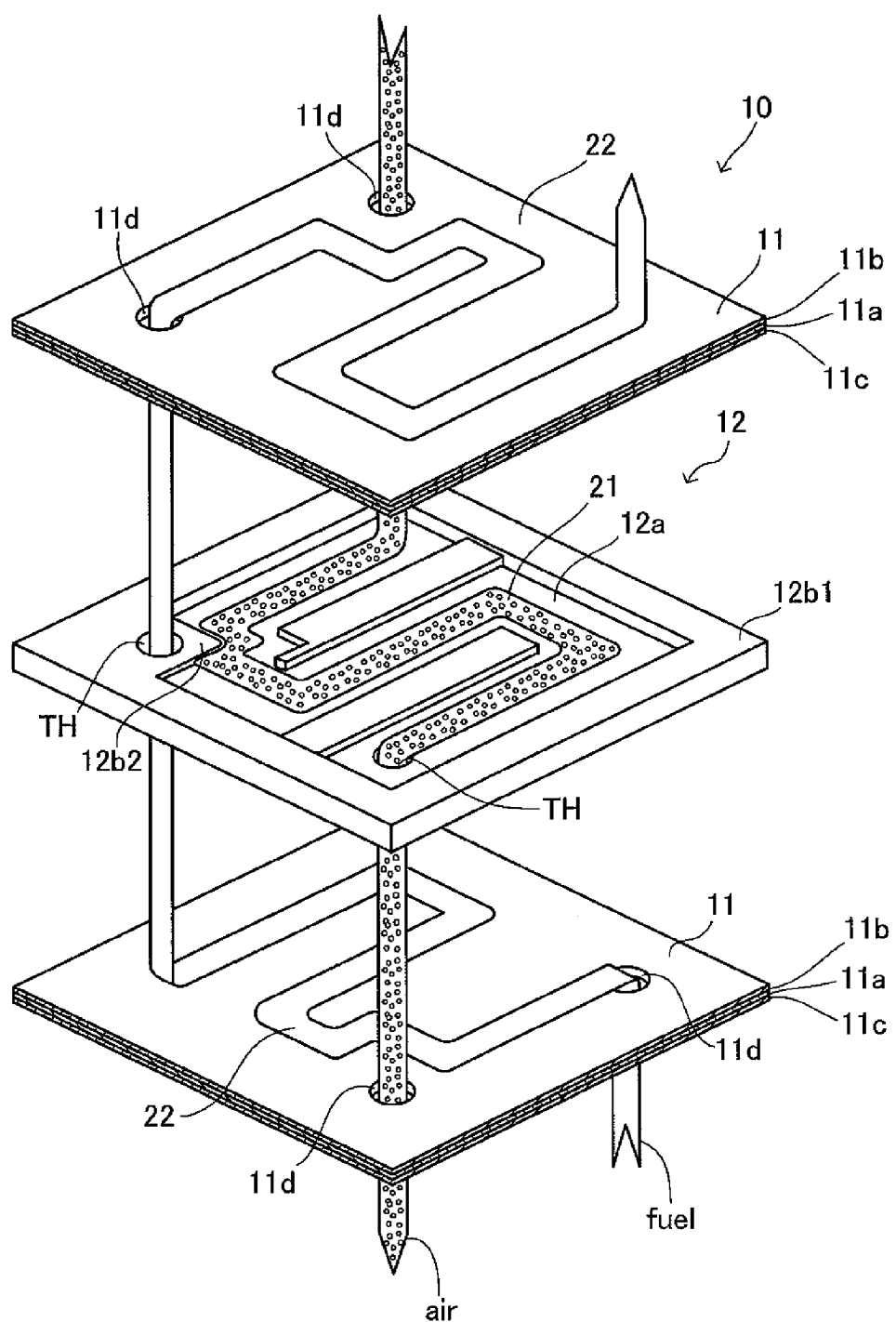
FIG. 5 is a view for explaining flow of fuel and air in the fuel cell shown in FIG. 1.

As shown in, for example, FIG. 5, the thus-configured fuel cell 10 is supplied with a fuel into the fuel flow channel 22 formed between the fuel electrode layer 11b of the sheet body 11 and the lower surface of the plane portion 12a of the support member 12 and is also supplied with air into the air flow channel 21 formed between the air electrode layer 11c of the sheet body 11 and the upper surface of the plane portion 12a of the support member 12, thereby generating electricity according to Chemical Reaction Formulas (1) and (2) shown below.

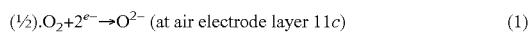
$(½).O_2 + 2e^- \rightarrow O^{2-}$ (at air electrode layer 11c)　　(1)

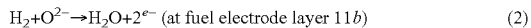
$H_2 + O^{2-} \rightarrow H_2O + 2e^-$ (at fuel electrode layer 11b)　　(2)

Since the fuel cell (SOFC) 10 generates electricity through utilization of oxygen conductivity of the solid electrolyte layer 11a, the working temperature of the fuel cell 10 is generally 600° C. or higher. Accordingly, for use of the fuel cell 10, the temperature of the fuel cell 10 is raised from room temperature to the working temperature (e.g., 800° C.) by means of an external heating mechanism (e.g., a heating mechanism which uses a resistance heater or a heating mechanism which utilizes heat generated through combustion of a fuel gas).

Figure 6:
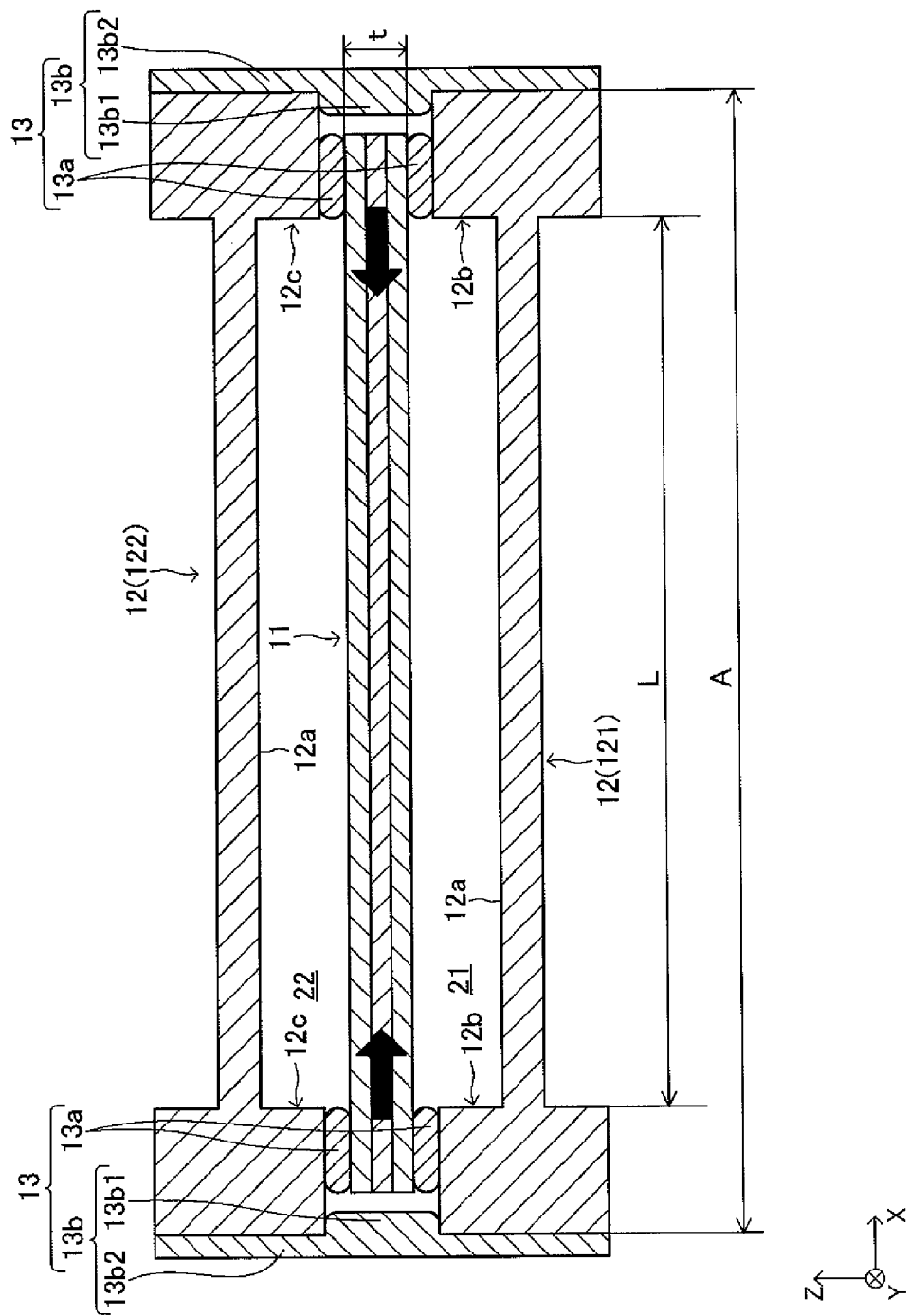
FIG. 6 is a schematic view corresponding to FIG. 4, exaggeratedly showing a seal and its periphery of the fuel cell shown in FIG. 1.

Seal Material 13:

Next, the seal 13 will be described. FIG. 6 is a schematic, vertical sectional view, as viewed at room temperature, of the sheet body 11 and the paired support members 12 in a state of supporting (holding) the sheet body 11 therebetween, the sectional view being taken along a plane which includes line 3-3 in parallel with the x-axis in FIG. 2 and which is in parallel with an x-z plane. The line 3-3 passes through the center of the planar shape (square shape) of the support member 12 (the center of the planar shape (square shape) of the sheet body 11). In FIG. 6, for easy visibility of the shape of the seal 13, the shape (particularly, thickness) of the seal 13 is exaggeratedly depicted. Also, in FIG. 6, the depiction of the above-mentioned metal meshes is omitted.

As shown in FIG. 6, the seal 13 has a first seal portion 13a for sealing a space (interface) between the upper surface of a perimetric portion of the sheet body 11 and the lower surface of the lower frame portion 12c of the upper support member 122 and for sealing a space (interface) between the lower surface of the perimetric portion of the sheet body 11 and the upper surface of the upper frame portion 12b of the lower support member 121. Hereinafter, these spaces may be collectively referred to as the "first space."

The seal 13 also has a second seal portion 13b, which is separated from the first seal portion 13a, for sealing a space (interface) between the lower side end (the lower end of the side surface) of the lower frame portion 12c of the upper support member 122 and the upper side end (the upper end of the side surface) of the upper frame portion 12b of the lower support member 121. Hereinafter, the space may be referred to as the "second space." Specifically, the second seal portion 13b has an ingress portion 13b1, which ingresses into a space between the lower surface of the lower frame portion 12c of the upper support member 122 and the upper surface of the upper frame portion 12b of the lower support member 121, and a cover portion 13b2, which is integral with the ingress portion 13b1 and covers the (outer) side surface of the lower frame portion 12c of the upper support member 122 and the (outer) side surface of the upper frame portion 12b of the lower support member 121. The cover portion 13b2 continuously covers the entire side surface of the fuel cell 10 having a stack structure.

The entire first seal portion 13a is of glass having a first softening point lower than the above-mentioned working temperature. The entire second seal portion 13b is of glass having a softening point (second softening point) higher than the first softening point, or of ceramic (specifically, a material having crystalline phase, such as crystallized glass or glass-ceramic; amorphous phase and crystalline phase may be mixedly present). The first and second softening points will be described later.

Thus, the first seal portion 13a exhibits a function of sealing the first space. Additionally, when the temperature of the fuel cell 10 (specifically, the temperature of the first seal portion 13a) is lower than the first softening point, the first seal portion 13a fixes a perimetric portion of the sheet body 11 as well as the lower frame portion 12c of the upper support member 122 and the upper frame portion 12b of the lower support member 121 (hereinafter, may be referred to as the "paired frame portions"), such that relative movement is completely disabled.

When the temperature of the fuel cell 10 (specifically, the temperature of the first seal portion 13a) is equal to or higher than the first softening point, the first seal portion 13a is softened and thus allows the perimetric portion of the sheet body 11 to move in relation to the "paired frame portions." That is, in the middle of the fuel cell 10 (accordingly, the first seal 13a) being raised in temperature from room temperature to the working temperature, the perimetric portion of the sheet body 11 becomes movable in relation to the "paired frame portions."

As mentioned previously, the thermal expansion coefficient of the support member 12 is higher than the mean thermal expansion coefficient of the sheet body 11. Accordingly, during the course of the fuel cell 10 being raised in temperature from room temperature to the working temperature, the support member 12 attempts to expand along the planar direction more than does the sheet body 11. Under the condition, if the perimetric portion of the sheet body 11 continues being fixed to the "paired frame portions" such that relative movement is completely disabled, the perimetric portion of the sheet body 11 is potentially subjected to an excessive tensile force (thermal stress) which is imposed along the planar direction by the "paired frame portions." Also, in the case where a temperature difference arises locally in the interior of the fuel cell 10 at the time of, for example, quick start of the fuel cell 10, the sheet body 11 is subjected to thermal stress induced by the temperature difference as in the above-mentioned case.

By contrast, in the present embodiment, in the middle of the fuel cell 10 being raised in temperature from room temperature to the working temperature, the perimetric portion of the sheet body 11 becomes movable toward the center in relation to the "paired frame portions" (see the black arrows in FIG. 6). Accordingly, when the temperature of the fuel cell 10 reaches the working temperature, the above-mentioned tensile force (thermal stress) which the "paired frame portions" impose on the sheet body 11 can be restrained from becoming excessive. As a result, the occurrence of cracks in the sheet bodies 11 or a like problem can be restrained.

Meanwhile, the second seal portion 13b exhibits a function of sealing the above-mentioned second space. Also, when the second softening point is higher than the working temperature, the second seal portion 13b does not soften over the temperature range of from room temperature to the working temperature. In the case where glass used to form the second seal portion 13b has a crystallization temperature (>second softening point), even when the second softening point is lower than the working temperature, after the temperature of the second seal portion 13b is raised at least once to a temperature higher than the crystallization temperature, the second seal portion 13b is partially or entirely crystallized. Therefore, even when the temperature of the fuel cell 10 reaches the working temperature, the second seal portion 13b can fix the "paired frame portions" together such that relative movement is completely disabled. That is, the shape of the entire fuel cell 10 (the stack structure shape) can be maintained.

As mentioned above, the seal 13 has the following features. The first seal portion 13a has a function of allowing movement of the perimetric portion of the sheet body 11 in relation to the "paired frame portions," in addition to a sealing function. The second seal portion 13b has a function of maintaining the shape of the entire fuel cell 10, in addition to a sealing function.

In this manner, the seal 13 differs in glass material depending on location in a region which the seal 13 occupies. By virtue of this, a sealing function (specifically, a function of preventing the mixing of a fuel gas flowing through the fuel flow channel 22 and air flowing through the air flow channel 21 and outward leakage of the fuel gas and air) and a function of maintaining the shape of the entire fuel cell 10 can be stably exhibited, and the occurrence of cracks in the sheet bodies 11 can be restrained at the time of the temperature of the fuel cell 10 being raised to the working temperature.

Next will be described a preferred relation among the working temperature of the fuel cell 10, the first softening point, and the second softening point. Preferably, at a working temperature of the fuel cell 10 of 600° C. to 900° C. inclusive, the first softening point is 400° C. to 700° C. inclusive, and the second softening point is 600° C. to 900° C. inclusive. Our studies have revealed that, through employment of the temperature relation, while a function of maintaining the shape of the entire fuel cell 10 is stably exhibited, the occurrence of cracks in the sheet bodies 11 can be effectively restrained at the time of the temperature of the fuel cell 10 being raised to the working temperature.

Tables 1 and 2 show the results of tests conducted to verify the preferred temperature relation. Each of the sheet bodies used in the tests had, as viewed in plane, a square shape whose length of one side was 30 mm and was of a fuel-electrode-support-type (a fuel electrode layer serves as a support substrate) in which an electrolyte layer of 8YSZ (thickness: 3 μm), a fuel electrode layer of NiO-8YSZ (thickness: 150 μm), and an air electrode layer of LSCF (thickness: 15 μm) were stacked in layers. By use of the sheet bodies, 3-layer stacks were fabricated. By use of the 3-layer stacks, the tests were conducted.

TABLE 1

| Main component of glass | Softening point | Results |
| --- | --- | --- |
| $SiO_2$—$B_2O_3$—PbO | 380° C. | Drop in output due to marked poisoning of sheet bodies |
| $SiO_2$—$B_2O_3$—PbO | 400° C. | Good release of stress from sheet bodies (no damage) |
| $SiO_2$—$B_2O_3$—PbO | 450° C. | Good release of stress from sheet bodies (no damage) |
| $SiO_2$—$B_2O_3$—PbO | 505° C. | Good release of stress from sheet bodies (no damage) |
| $SiO_2$—$B_2O_3$—PbO | 615° C. | Good release of stress from sheet bodies (no damage) |
| $SiO_2$—PbO | 650° C. | Good release of stress from sheet bodies (no damage) |
| $SiO_2$—ZnO—PbO | 685° C. | Good release of stress from sheet bodies (no damage) |
| $SiO_2$—$B_2O_3$—PbO | 700° C. | Good release of stress from sheet bodies (no damage) |
| $SiO_2$—$B_2O_3$—RO* | 720° C. | Damage to sheet bodies |

*R in RO is an alkali earth metal of Mg, Ca, Sr, or Ba.

Table 1 shows the results of the test conducted in the following manner. The temperature of the fuel cell 10 was repeatedly raised rapidly in 10 minutes from room temperature to a working temperature of 800° C. for each of various first softening points, which were attained by varying a component of glass used to form the first seal portion 13a. A drop in output of each of the stacks was evaluated by measuring the electromotive force of the sheet bodies in a state where current was maintained at a predetermined constant value. Whether or not the sheet bodies were damaged was evaluated by measuring a gas flow balance of each of the tested stacks.

As shown in Table 1, when the first softening point was lower than 400° C., the splash (poisoning), to the sheet body 11, of a component of glass used to form the first seal portion 13a was remarkable. As a result, the surface area of the sheet body 11 which contributed to reactions reduced, so that the output of the fuel cell 10 dropped greatly. In the present experiment, in order to lower the first softening point, the content of PbO, whose melting point is low, in the material of the first seal portion 13a was increased. As a result, the sheet body 11 was conceivably poisoned markedly with PbO.

When the first softening point was higher than 700° C., in the course of temperature rise, the sheet body 11 was damaged (cracked) due to thermal stress. Conceivably, this is because the release of stress was delayed due to a delay of time when the softening of the first seal portion 13a started.

When the first softening point was between 400° C. to 700° C. inclusive, the poisoning of the sheet body 11 is not remarkable, and the sheet body 11 is not damaged through appropriate release of stress from the sheet body 11. Therefore, when the working temperature of the fuel cell 10 is 800° C., the first softening point is preferably 400° C. to 700° C. inclusive.

TABLE 2

| Main component of glass | Softening point | Crystallization temperature | Results |
| --- | --- | --- | --- |
| $SiO_2$—PbO—$B_2O_3$ | 575° C. | 650° C. | Poor seal |
| $SiO_2$—PbO | 600° C. | 645° C. | Good stack shape |
| $B_2O_3$—ZnO | 625° C. | 685° C. | Good stack shape |
| $SiO_2$—$B_2O_3$—PbO | 660° C. | 713° C. | Good stack shape |
| $SiO_2$—$B_2O_3$—PbO | 700° C. | 757° C. | Good stack shape |
| $SiO_2$—$B_2O_3$—PbO | 750° C. | 945° C. | Good stack shape |
| $SiO_2$—$B_2O_3$—RO* | 780° C. | 881° C. | Good stack shape |
| $SiO_2$—ZnO—RO* | 800° C. | 910° C. | Good stack shape |
| $SiO_2$—$ZrO_2$—$R_2O$* | 900° C. | 945° C. | Good stack shape |
| $SiO_2$—$B_2O_3$—RO* | 930° C. | 963° C. | Poor seal |

*R in RO is an alkali earth metal of Mg, Ca, Sr, or Ba. R in $R_2O$ is an alkali metal of Li, Na, or K.

Table 2 shows the results of the test conducted in the following manner. By use of the above-mentioned 3-layer stacks, the temperature of the fuel cell 10 was repeatedly raised rapidly from room temperature to a working temperature of 800° C. for each of various materials used to form the second seal portion 13b (for each of various combinations of the second softening point and the crystallization temperature). The material used to form the second seal portion 13b was crystallized glass (glass whose glass phase is partially crystallized; in the glass, crystalline phase and amorphous phase are mixedly present, but the glass can be said to be ceramic in the broad sense) having a softening point higher than the first softening point.

As shown in Table 2, when the second softening point was lower than 600° C., the sealing performance of the second seal portion 13b was insufficient. That is, at a working temperature of 800° C., when the pressure difference between the interior and the exterior of the gas flow channel was increased by increasing the flow rate of a gas supplied to the fuel cell 10, the gas leaked out from a region sealed by the second seal portion 13b (specifically, from the interface between the side surface of the support member 12 and the cover portion 13b2 of the second seal portion 13b). In the present embodiment, a gas leakage from the region sealed by the second seal portion 13b can occur when the gas leaks from a region sealed by the first seal portion 13a.

In the case where the second softening point was higher than 900° C. when the temperature of the fuel cell 10 was repeatedly increased and decreased between room temperature and the working temperature (800° C.), the cover portion 13b2 of the second seal portion 13b was damaged (cracked). As in the case of a second softening point lower than 600° C., the sealing performance of the second seal portion 13b was insufficient.

Meanwhile, when the second softening point was between 600° C. to 900° C. inclusive, the second seal portion 13b exhibits sufficient sealing performance, and the stack shape is maintained in a good condition. Thus, when the working temperature of the fuel cell 10 is 800° C., the second softening point (higher than the first softening point) is preferably 600° C. to 900° C. inclusive.

The above-mentioned two sets of test results are of the tests conducted at a working temperature of the fuel cell 10 of 800° C. However, even at a working temperature of the fuel cell 10 of 600° C., 700° C., and 900° C., it has been verified from a similar reason that "a first softening point of 400° C. to 700° C. inclusive and a second softening point of 600° C. to 900° C. inclusive are preferred." Thus, when the working temperature of the fuel cell 10 is 600° C. to 900° C. inclusive, a first softening point of 400° C. to 700° C. inclusive and a second softening point of 600° C. to 900° C. inclusive can be said to be preferred.

Figure 7:
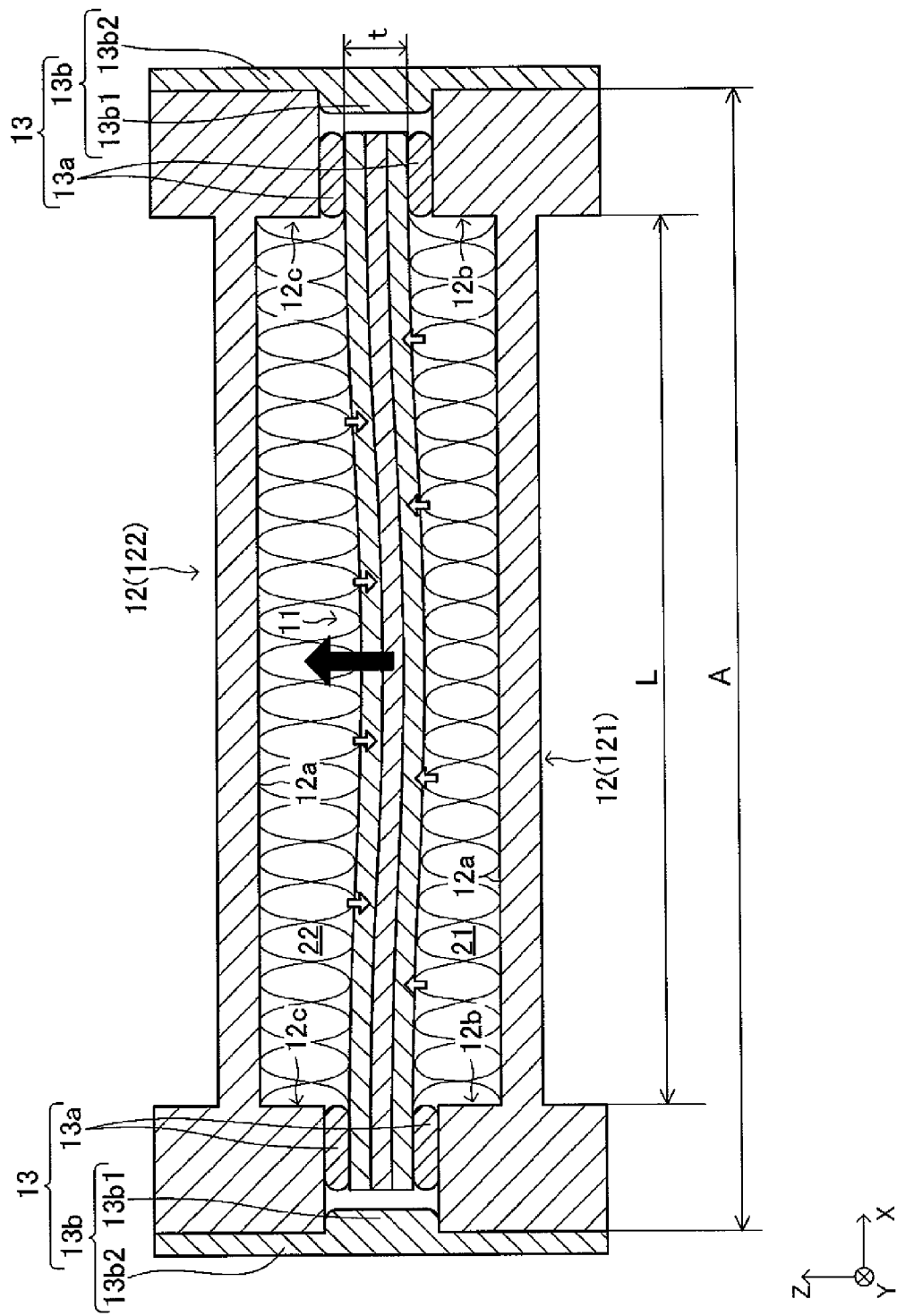
FIG. 7 is a view showing imposition of elastic forces on a sheet body from metal meshes confined in a fuel flow channel and an air flow channel, respectively.

Next, the aforementioned metal mesh will be additionally described. The above description does not take into account the deformation of the sheet body 11. However, since the sheet body 11 is very thin, and the above-mentioned three layers used to form the sheet body 11 differ in thermal expansion coefficient, as shown in FIG. 7, actually, at room temperature, a central portion of the sheet body 11 tends to be warped downward (i.e., in such a direction that the surface of the fuel electrode layer 11b is concaved). As the temperature of the fuel cell 10 rises from room temperature, the amount of warp (warp height) reduces (refer to the black arrow in FIG. 7).

In the course of temperature rise from room temperature (i.e., in the course of reduction in the amount of warp), as the amount of warp of the sheet body 11 reduces, the metal meshes confined above and below the sheet body 11 change in height along the stacking direction. As a result, loads (refer to white arrows in FIG. 7) which the upper and lower metal meshes respectively impose on the sheet body 11 in the contact regions therebetween change accordingly. Our studies have revealed that, as compared with the case where the metal meshes are not confined, in the case where the metal meshes are confined, at the time of, for example, quick start of the fuel cell 10, cracking of the sheet body 11 becomes less likely to occur. Conceivably, this is attained by the synergy effect of the aforementioned softening of the first seal portion 13a and the changing of elastic forces which the upper and lower metal meshes impose on the corresponding sheet body 11.

Next will be described a preferred range of the elastic modulus with respect to the stacking direction (the ratio of an elastic-force change to a height change of the metal mesh with respect to the stacking direction in an elastic region) of the above-mentioned metal mesh. In the fuel cell 10 (in the case of a thickness of the sheet body 11 of 20 μm to 500 μm inclusive), the elastic modulus of the metal mesh is preferably 0.1 N/μm to 8 N/μm inclusive. Our studies have revealed that, through employment of the preferred elastic modulus range, an electrical connection is reliably ensured between the adjacent sheet body 11 and support members 12, and that, at the time of, for example, quick start of the fuel cell 10, cracking of the sheet bodies 11 becomes unlikely to occur.

Table 3 shows the results of the test conducted to verify the above-mentioned preferred range of the elastic modulus of the metal mesh. This test was also conducted by use of the above-mentioned 3-layer stacks. The elastic modulus of the metal mesh can be arbitrarily adjusted by adjusting the specifications of the metal mesh (e.g., the wire diameter of a mesh material, the shape of embossments, and the arrangement pitch of embossments). The above-mentioned 3-layer stack was assembled in a state where metal meshes each having a predetermined shape were joined (by diffusion bonding, spot welding, or the like) to the corresponding support members.

TABLE 3

| Elastic modulus of metal mesh | Results |
| --- | --- |
| 0.05 N/μm | Great drop in output due to poor current-collecting connection (no damage to sheet bodies) |
| 0.1 N/μm | No damage to sheet bodies after 10 times of heatup test |
| 0.5 N/μm | No damage to sheet bodies after 10 times of heatup test |
| 1.0 N/μm | No damage to sheet bodies after 10 times of heatup test |

TABLE 3-continued

| Elastic modulus of metal mesh | Results |
|---|---|
| 3.5 N/µm | No damage to sheet bodies after 10 times of heatup test |
| 5.0 N/µm | No damage to sheet bodies after 10 times of heatup test |
| 7.0 N/µm | No damage to sheet bodies after 10 times of heatup test |
| 8.0 N/µm | No damage to sheet bodies after 10 times of heatup test |
| 9.0 N/µm | Damage to sheet bodies after 2 times of heatup test |
| 10.0 N/µm | Damage to sheet bodies after 2 times of heatup test |
| 12.0 N/µm | Damage to sheet bodies in the course of stack assembly |

Table 3 shows the results of the test conducted in the following manner. The temperature of the fuel cell 10 was repeatedly raised rapidly in 5 minutes from room temperature to a working temperature of 800° C. for each of various elastic moduluses of the metal meshes. The same elastic modulus was imparted to the metal meshes on both of the fuel-electrode side and the air-electrode side. Notably, the metal mesh on the fuel side and the metal mesh on the air side can have respectively appropriate elastic moduluses.

As shown in Table 3, when the elastic modulus of the metal mesh is higher than 8 N/µm, cracking of the sheet body 11 is even more likely to occur. Conceivably, this is because, when the elastic modulus is high, in the course of reduction in the amount of warp, the amount of change in an elastic force of the metal mesh increases; as a result, an excessive stress is apt to be locally generated in the sheet body 11.

When the elastic modulus of the metal mesh is lower than 0.1 N/µm, the output density of the fuel cell 10 dropped. Conceivably, this is because, when the elastic modulus is low, the preload of the metal mesh reduces; as a result, a poor contact is apt to arise in a contact region (at contacts) between the metal mesh and the support member 12 or between the metal mesh and the sheet body 11.

When the elastic modulus of the metal mesh is 0.1 N/µm to 8 N/µm inclusive, a drop in the output density of the fuel cell 10 does not occur, and cracking of the sheet bodies 11 does not occur. Thus, in the fuel cell 10 (in the case of a thickness of the sheet body 11 of 20 µm to 500 µm inclusive), the elastic modulus of the metal mesh is preferably 0.1 N/µm to 8 N/µm inclusive.

Next, an example method for manufacturing the fuel cell 10 will be briefly described. First, the sheet body 11 of, for example, an electrolyte-support-type (the electrolyte layer serves as a support substrate) is formed as follows. A sheet (which is to become the fuel electrode layer 11b) is formed by a printing process on the upper surface of a ceramic sheet (YSZ tape) prepared by a green sheet process; the resultant laminate is fired at 1,400° C. for one hour; a sheet (which is to become the air electrode layer 11c) is formed similarly by a printing process on the lower surface of the resultant fired body; and the resultant laminate is fired at 1,200° C. for one hour.

The sheet body 11 of a fuel-electrode-support-type (the fuel electrode layer serves as a support substrate) is formed as follows. A ceramic sheet (YSZ tape) prepared by a green sheet process is laminated on the lower surface of a sheet (which is to become the fuel electrode layer 11b); the resultant laminate is fired at 1,400° C. for one hour; a sheet (which is to become the air electrode layer 11c) is formed by a printing process on the lower surface of the resultant fired body; and the resultant laminate is fired at 850° C. for one hour. In this case, the sheet body 11 may be formed as follows: a ceramic sheet is formed by a printing process on the lower surface of a sheet (which is to become the fuel electrode layer 11b); the resultant laminate is fired at 1,400° C. for one hour; a sheet (which is to become the air electrode layer 11c) is formed by a printing process on the lower surface of the resultant fired body; and the resultant laminate is fired at 850° C. for one hour.

The support members 12 can be formed by etching, cutting, etc.

Next, a glass material (borosilicate glass) used to form the first seal portion 13a is applied by a printing process to those perimetric portions of the support members 12 which are to hold the sheet body 11 therebetween (i.e., the lower surface of the lower frame portion 12c and the upper surface of the upper frame portion 12b). Next, the support members 12 and the sheet bodies 11 are stacked in alternating layers, followed by heat treatment (800° C. for one hour) for integration of the layers into a stack structure. Subsequently, a material (borosilicate-base crystallized glass or the like) used to form the second seal portion 13b is applied to the side wall of the stack structure, followed by heat treatment (e.g., 850° C. for one hour) for reinforcement. The fuel cell 10 is thus completed.

As described above, in the solid oxide fuel cell 10 having a stack structure according to the embodiment of the present invention, the entire perimetric portion of each of the sheet bodies 11 and the corresponding "paired frame portions" are sealed against each other by the seal 13 formed of glass. The seal material 13 is such that the softening point of the first seal portion 13a is lower than the working temperature of the fuel cell 10 and such that the softening point of the second seal portion 13b is higher than the working temperature of the fuel cell 10. By virtue of this, a seal function (specifically, a function of preventing the mixing of a fuel gas flowing through the fuel flow channel 22 and air flowing through the air flow channel 21 and outward leakage of the fuel gas and air) and a function of maintaining the shape of the entire fuel cell 10 can be stably exhibited, and the occurrence of cracks in the sheet bodies 11 can be restrained at the time of the temperature of the fuel cell 10 being raised to the working temperature.

Additionally, the metal meshes are confined in the air flow channel 21 and the fuel flow channel 22, respectively, in such a manner as to generate an elastic force (i.e., a preload) that acts in such directions as to move the corresponding support member 12 and sheet body 11 away from each other along the stacking direction. The elastic modulus of the metal mesh along the stacking direction is set to 0.1 N/µm to 8 N/µm inclusive. By virtue of this, an electrical connection is reliably ensured between the adjacent sheet body 11 and support members 12, and, at the time of, for example, quick start of the fuel cell 10, cracking of the sheet bodies 11 becomes unlikely to occur.

The present invention is not limited to the above-described embodiment, but can be modified in various other forms without departing from the scope of the present invention. For example, in the embodiment, the second seal portion 13b is of glass having the second softening point and the crystallization temperature, or of a like material, but may be of an inorganic substance which does not soften at the working temperature or lower (i.e., ceramic), or of a like material.

Figure 8:
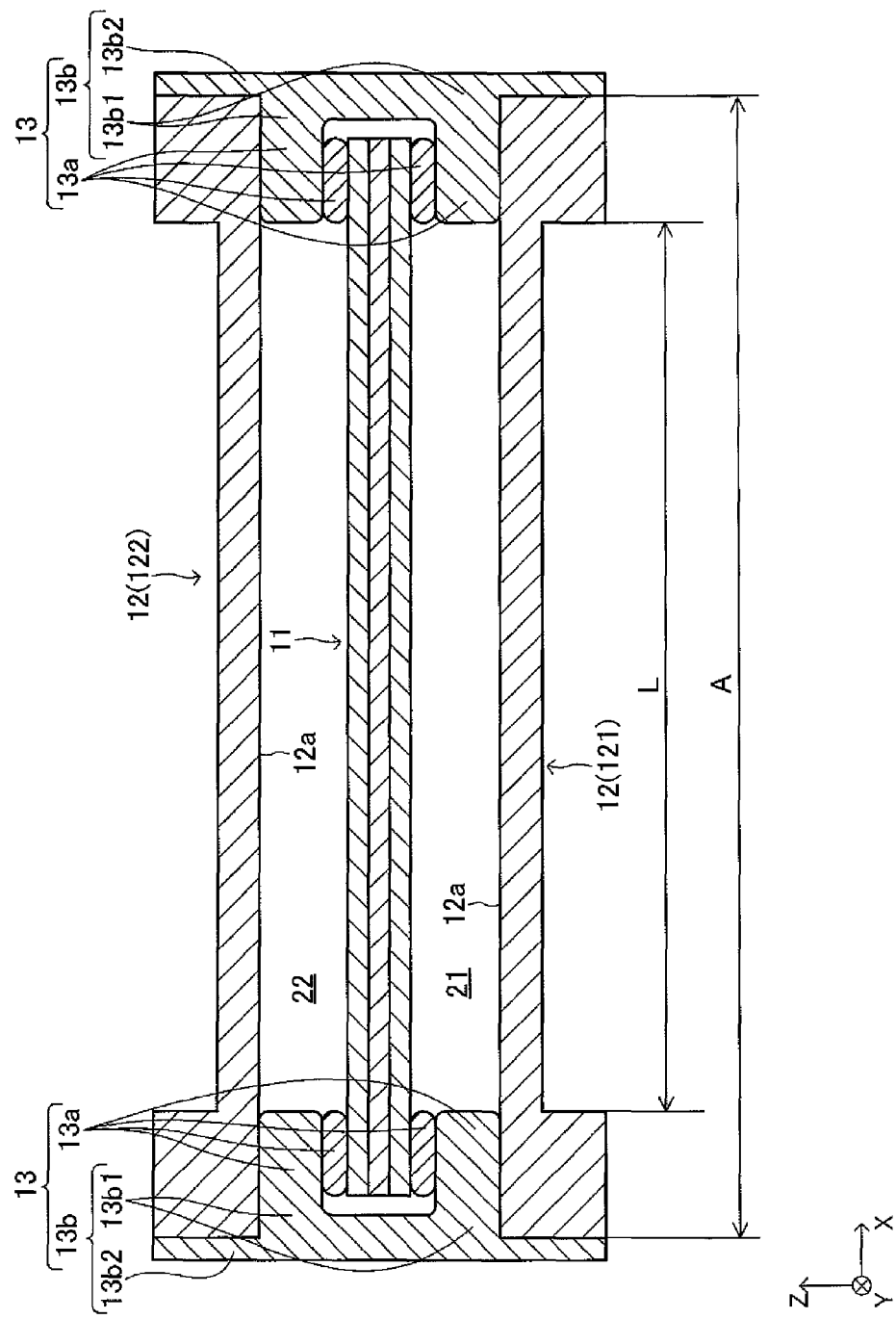
FIG. 8 is a schematic view corresponding to FIG. 4, exaggeratedly showing a seal and its periphery of a solid oxide fuel cell according to a modified embodiment of the present invention.

In the above-described embodiment, the first and second seal portions 13a and 13b are separated from each other. However, as shown in FIG. 8, the first and second seal portions 13a and 13b may be integral with each other. In FIG. 8, the first seal portion 13a for sealing the above-mentioned "first space" is such that a portion in contact with the upper and lower surfaces of a perimetric portion of the sheet body 11 is of glass having the first softening point, whereas a portion in contact with the lower surface of the lower frame portion 12c of the upper support member 122 and the upper surface of the upper frame portion 12b of the lower support member 121 is of glass having the second softening point. The ingress portion 13b1 of the second seal portion 13b of glass having the second softening point is integral with a portion of the first seal portion 13a of glass having the second softening point.

Figure 9:
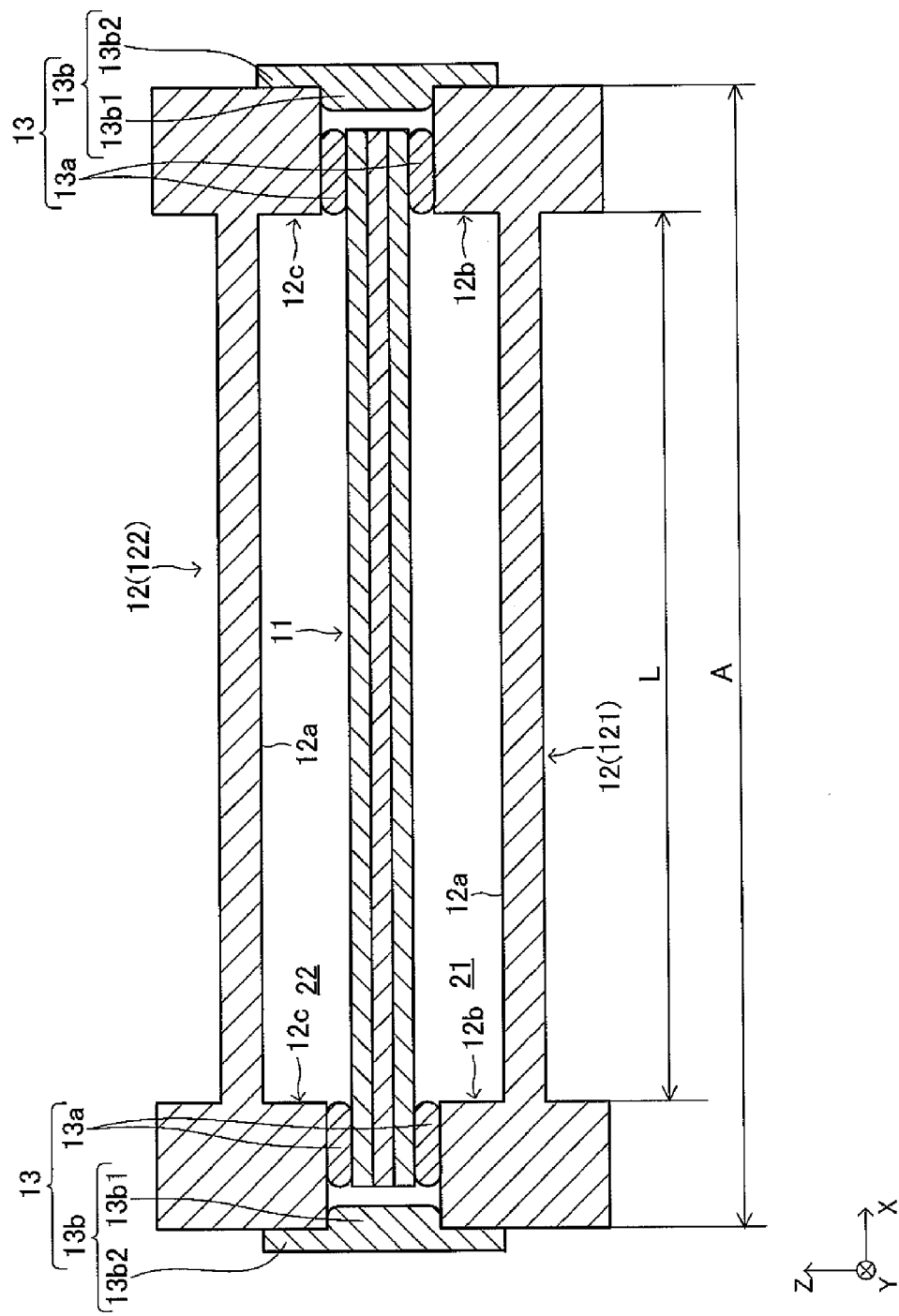
FIG. 9 is a schematic view corresponding to FIG. 4, exaggeratedly showing a seal and its periphery of a solid oxide fuel cell according to another modified embodiment of the present invention.

In the above-described embodiment, the cover portion 13b2 of the second seal portion 13b continuously covers the entire side surface of the fuel cell 10 having a stack structure. However, as shown in FIG. 9, the cover portion 13b2 may be formed discretely for each of the sheet bodies 11.

In the above-described embodiment, the first and second seal portions 13a and 13b are of materials of different compositions. However, the first and second seal portions 13a and 13b may be formed from materials of the same composition. Specifically, the materials of the first and second seal portions 13a and 13b may be prepared such that they have the same composition but differ in the grain size of glass or in trace additives or the like so as to differ in the degree of crystallization for imparting different functions to the seals 13a and 13b, respectively.

For example, the first seal portion 13a is of a glass material having a large grain size (e.g., about 1 μm), whereas the second seal portion 13b is of a glass material having a small grain size (e.g., 0.3 μm or less). By virtue of this, at the time of heat treatment (at, for example, 850° C.) for glass bonding in the course of stack assembly, the degree of crystallization can differ therebetween. Specifically, in the first seal portion 13a having a large grain size, crystallization is not completed, and a semicrystalline state in which an amorphous layer partially remains is maintained. By contrast, in the second seal portion 13b having a small grain size, crystallization can be completed. As a result, the first seal portion 13a in a semicrystalline state can have a thermal-stress relief function, and the second seal portion 13b in which crystallization is completed can have a gas seal function.

Figure 10:
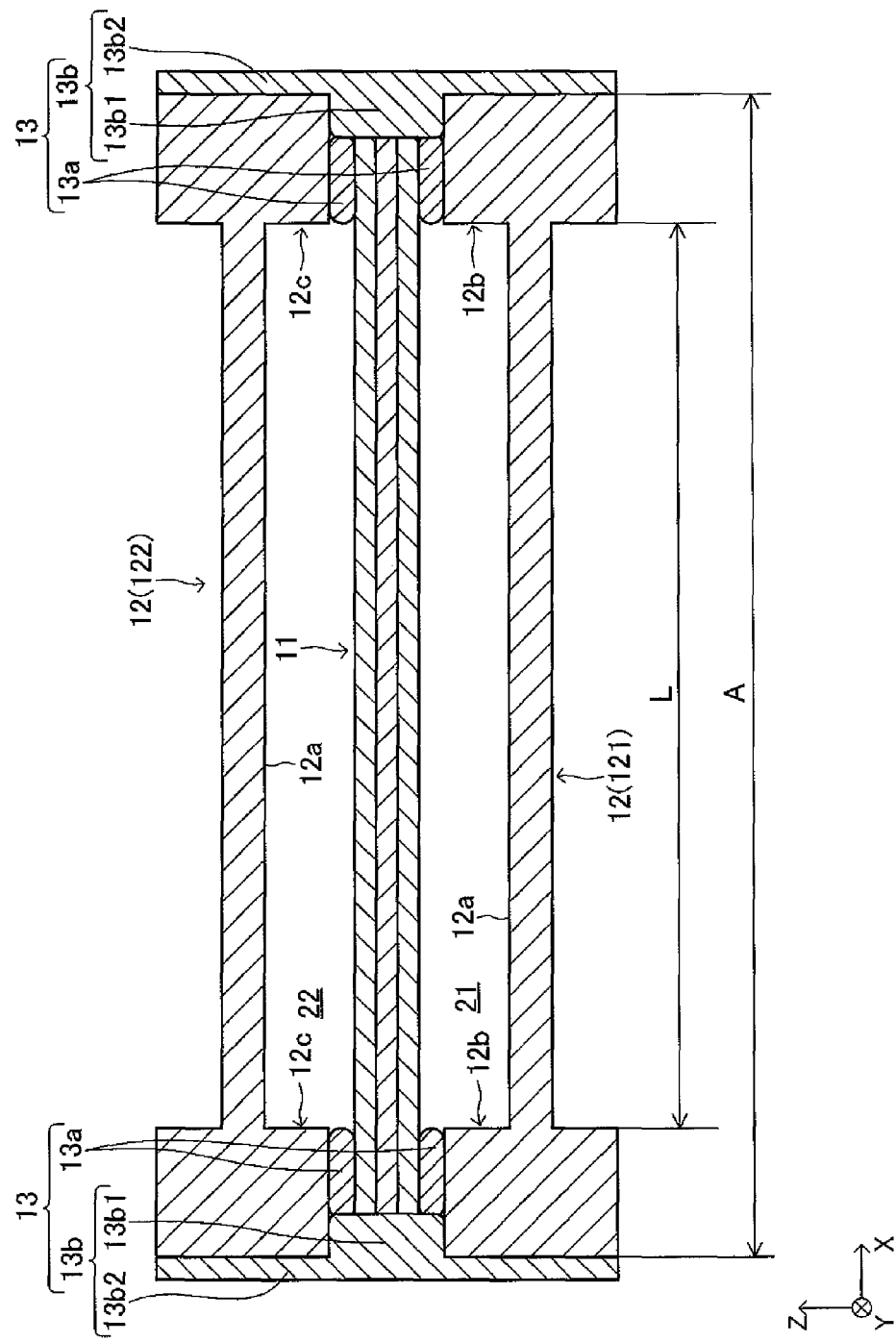
FIG. 10 is a schematic view corresponding to FIG. 4, exaggeratedly showing a seal and its periphery of a solid oxide fuel cell according to still another modified embodiment of the present invention.

When the first and second seal portions 13a and 13b are of the same-composition-based materials, the occurrence of the following problem can be restrained: during operation of the SOFC in which the first and second seal portions 13a and 13b are of materials of different compositions, the degeneration of the seal materials occurs in a contact zone which is generated as a result of contact between the first and second seal portions 13a and 13b caused by thermal hysteresis. Therefore, as shown in FIG. 10, the first seal portion 13a and the ingress portion 13b1 of the second seal portion 13b can be brought in contact with each other beforehand.

In the above-described embodiment, the fuel electrode layer 11b can be formed from, for example, platinum, platinum-zirconia cermet, platinum-cerium-oxide cermet, ruthenium, or ruthenium-zirconia cermet.

Also, the air electrode layer 11c can be formed from, for example, lanthanum-containing perovskite-type complex oxide (e.g., lanthanum manganite or lanthanum cobaltite). Lanthanum cobaltite and lanthanum manganite may be doped with strontium, calcium, chromium, cobalt (in the case of lanthanum manganite), iron, nickel, aluminum, or the like. Also, the air electrode layer 11c may be formed from palladium, platinum, ruthenium, platinum-zirconia cermet, palladium-zirconia cermet, ruthenium-zirconia cermet, platinum-cerium-oxide cermet, palladium-cerium-oxide cermet, or ruthenium-cerium-oxide cermet.

In the above-described embodiment, the sheet body 11 and the support member 12 have a planar shape of square. However, the sheet body 11 and the support member 12 may have a planar shape of rectangle, circle, ellipse, etc.

The above embodiment is described while mentioning the solid oxide fuel cell (SOFC) as a reactor. However, the reactor may be a ceramic reactor; for example, an exhaust-gas purification reactor.

What is claimed is:

1. A reactor comprising:
   a single or a plurality of sheet bodies in which a chemical reaction is carried out at a working temperature higher than room temperature, and
   a plurality of support members for supporting the single or the plurality of sheet bodies,
   the single or the plurality of sheet bodies and the plurality of support members being stacked in alternating layers,
   wherein, a perimetric portion of each of the sheet bodies is held between a lower surface of a perimetric portion of an upper support member, which is the support member adjacent to and located above the sheet body, and an upper surface of a perimetric portion of a lower support member, which is the support member adjacent to and located below the sheet body, and the perimetric portion of the sheet body, the perimetric portion of the upper support member, and the perimetric portion of the lower support member are sealed against one another by means of a seal;
   the seal includes a first seal portion for sealing against an upper face surface of the perimetric portion of the sheet body and the lower surface of the perimetric portion of the upper support member and for sealing against a lower face surface of the perimetric portion of the sheet body and the upper surface of the perimetric portion of the lower support member, wherein the entirety of the first seal portion is spaced from an end face surface of the sheet body, and a second seal portion for sealing against a lower side end of the perimetric portion of the upper support member and an upper side end of the perimetric portion of the lower support member, wherein the entirety of the second seal portion is separate from the upper and lower face surfaces of the sheet body; and
   at least a portion of the first seal portion which is in contact with the upper and lower face surfaces of the perimetric portion of the sheet body is of glass having a first softening point lower than the working temperature, whereas at least a portion of the second seal portion which is located between the lower side end of the perimetric portion of the upper support member and the upper side end of the perimetric portion of the lower support member is of glass having a second softening point higher than the first softening point, or of ceramic.

2. A reactor according to claim 1, wherein each of the sheet bodies has a thickness of 20 μm to 500 μm inclusive.

3. A reactor according to claim 1, functioning as a solid oxide fuel cell, wherein each of the sheet bodies is a fired laminate of a solid electrolyte layer, a fuel electrode layer formed on an upper surface of the solid electrolyte layer, and an air electrode layer formed on a lower surface of the solid electrolyte layer, and
   a fuel flow channel to which a fuel gas is supplied is formed in a space between an upper surface of the fuel electrode layer of each of the sheet bodies and a lower surface of a plane portion of the upper support member, the plane portion being located inward of the perimetric portion of the upper support member, and an air flow channel to which a gas that contains oxygen is supplied is formed in a space between a lower surface of the air electrode layer of the sheet body and an upper surface of a plane portion of the lower support member, the plane portion being located inward of the perimetric portion of the lower support member.

4. A reactor according to claim 3, wherein the working temperature is 600° C. to 900° C. inclusive; the first softening point is 400° C. to 700° C. inclusive; and the second softening point is 600° C. to 900° C. inclusive.

5. A reactor according to claim 1, wherein the first seal portion and the second seal portion are separated from each other, the entire first seal portion is of glass having the first softening point, and the entire second seal portion is of glass having the second softening point, or of ceramic, and the second seal portion has an ingress portion, which ingresses into a space between the lower surface of the perimetric portion of the upper support member and the upper surface of the perimetric portion of the lower support member, and a cover portion, which is integral with the ingress portion and covers a side surface of the perimetric portion of the upper support member and a side surface of the perimetric portion of the lower support member.

6. A reactor according to claim 1, wherein the entire first seal portion is of glass having the first softening point, and the entire second seal portion is of glass having the second softening point, or of ceramic;

the second seal portion has an ingress portion, which ingresses into a space between the lower surface of the perimetric portion of the upper support member and the upper surface of the perimetric portion of the lower support member, and a cover portion, which is integral with the ingress portion and covers a side surface of the perimetric portion of the upper support member and a side surface of the perimetric portion of the lower support member; and the first seal portion is in contact with the ingress portion of the second seal portion.

7. A reactor according to claim 1, wherein a current-collecting member is confined in each of a space between an upper surface of each of the sheet bodies and the lower surface of a plane portion of the upper support member, the plane portion being located inward of the perimetric portion of the upper support member, and a space between a lower surface of the sheet body and the upper surface of a plane portion of the lower support member, the plane portion being located inward of the perimetric portion of the lower support member, and ensures an electrical connection between the sheet body and each of the upper and lower support members;

the current-collecting members have elasticity along a stacking direction and are confined in such a manner as to generate respective elastic forces that act in such directions as to move the upper and lower support members away from the sheet body along the stacking direction; and an elastic modulus associated with the elasticity of each of the current-collecting members is 0.1 N/µm to 8 N/µm inclusive.

8. A reactor according to claim 1, wherein the first seal portion is arranged parallel to a first plane and the second seal portion is arranged in a second plane perpendicular to said first plane.

* * * * *